(12) United States Patent
Rychlinski et al.

(10) Patent No.: US 9,587,614 B2
(45) Date of Patent: Mar. 7, 2017

(54) AUTO STOP ENGINE CONTROL FOR VEHICLES

(71) Applicant: GM GLOBAL TECHNOLOGY OPERATIONS LLC, Detroit, MI (US)

(72) Inventors: Mark J. Rychlinski, Farmington Hills, MI (US); David W. Walters, Sterling Heights, MI (US); Michael G. Reynolds, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 14/669,954

(22) Filed: Mar. 26, 2015

(65) Prior Publication Data

US 2016/0281669 A1 Sep. 29, 2016

(51) Int. Cl.
*F02N 11/08* (2006.01)
*F02D 41/04* (2006.01)
*F02D 35/02* (2006.01)

(52) U.S. Cl.
CPC .......... *F02N 11/0818* (2013.01); *F02D 35/02* (2013.01); *F02D 41/042* (2013.01); *F02N 11/0825* (2013.01); *F02N 11/0837* (2013.01)

(58) Field of Classification Search
CPC ............. F02N 11/0818; F02N 11/0803; F02N 11/0811; F02N 11/0825; F02N 11/0833; F02N 11/0837; F02N 11/084; F02N 2200/022; F02N 2200/021; F02N 2200/041; F02D 35/02; F02D 31/009; F02D 31/001; F02D 41/042
See application file for complete search history.

(56) References Cited

U.S. PATENT DOCUMENTS

| | | | |
|---|---|---|---|
| 6,396,165 B1 * | 5/2002 | Nagano .................... | B60K 6/42 290/40 R |
| 2008/0071441 A1 * | 3/2008 | Nishigaki ............... | F02D 13/02 701/105 |
| 2013/0018569 A1 * | 1/2013 | Sangameswaran . | F02N 11/0825 701/112 |
| 2014/0107903 A1 * | 4/2014 | Kawazu ............. | F02D 41/0097 701/101 |

* cited by examiner

*Primary Examiner* — Lindsay Low
*Assistant Examiner* — George Jin
(74) *Attorney, Agent, or Firm* — Lorenz & Kopf, LLP

(57) ABSTRACT

Methods and systems are provided for controlling an auto stop feature of an engine of a vehicle. A sensor is configured to provide information pertaining to engine speed at first full compression of the engine and at predetermined times including and beyond the time to first full compression after commencement of engine crank. A processor is coupled to the sensor, and is configured to disable the auto stop feature if the engine speed is less than a predetermined speed threshold.

20 Claims, 3 Drawing Sheets

AUTO STOP ENGINE CONTROL FOR VEHICLES

TECHNICAL FIELD

The present disclosure generally relates to the field of vehicles and, more specifically, to methods and systems for control of auto stop functionality for engines of vehicles, such as automobiles.

BACKGROUND

Certain vehicles today having include an "auto stop" feature for the vehicle's engine. Such an "auto stop" feature (also referred to as an "auto stop/auto start" feature or a "stop/start" feature) typically includes the ability for the vehicle to automatically turn off and re-start the engine during appropriate circumstances as the vehicle is operating. For example, a vehicle with an auto stop feature may automatically turn off the engine while the driver is engaging the brake pedal and the vehicle is stopped (for example, at a stop light), and the vehicle may subsequently turn on the engine when the driver releases the brake pedal and/or engages the accelerator pedal of the vehicle.

Such auto stop features of engines of vehicles can be advantageous, for example in saving fuel, increasing fuel efficiency, reducing carbon dioxide ($CO_2$) generated for the vehicle, and reducing fuel expenses for the driver. However, it may be desirable to provide improved control of auto stop features in certain situations, such as controlling when the auto stop feature should be active or inactive.

Accordingly, it is desirable to provide improved methods and systems for controlling an auto stop feature for engines of vehicles, for example in controlling when the auto stop feature should be active or inactive. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for controlling an auto stop feature of an engine of a vehicle is provided. The method comprises determining, using information provided by a sensor, an engine speed at a first full compression of the engine after commencement of an engine crank, and disabling the auto stop feature if the engine speed is less than a predetermined speed threshold using a processor.

In accordance with another exemplary embodiment, a system for controlling an auto stop feature of an engine of a vehicle is provided. The system comprises a sensor and a processor. The sensor is configured to provide information pertaining to an engine speed at a first full compression of the engine after commencement of an engine crank. The processor is coupled to the sensor, and is configured to disable the auto stop feature if the engine speed is less than a predetermined speed threshold.

In accordance with a further exemplary embodiment, a vehicle is provided. The vehicle includes a drive system and a control system. The drive system comprises an engine having an auto stop feature. The control system comprises a sensor and a processor. The sensor is configured to provide information pertaining to an engine speed at a first full compression of the engine after commencement of an engine crank. The processor is coupled to the sensor, and is configured to disable the auto stop feature if the engine speed is less than a predetermined speed threshold.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
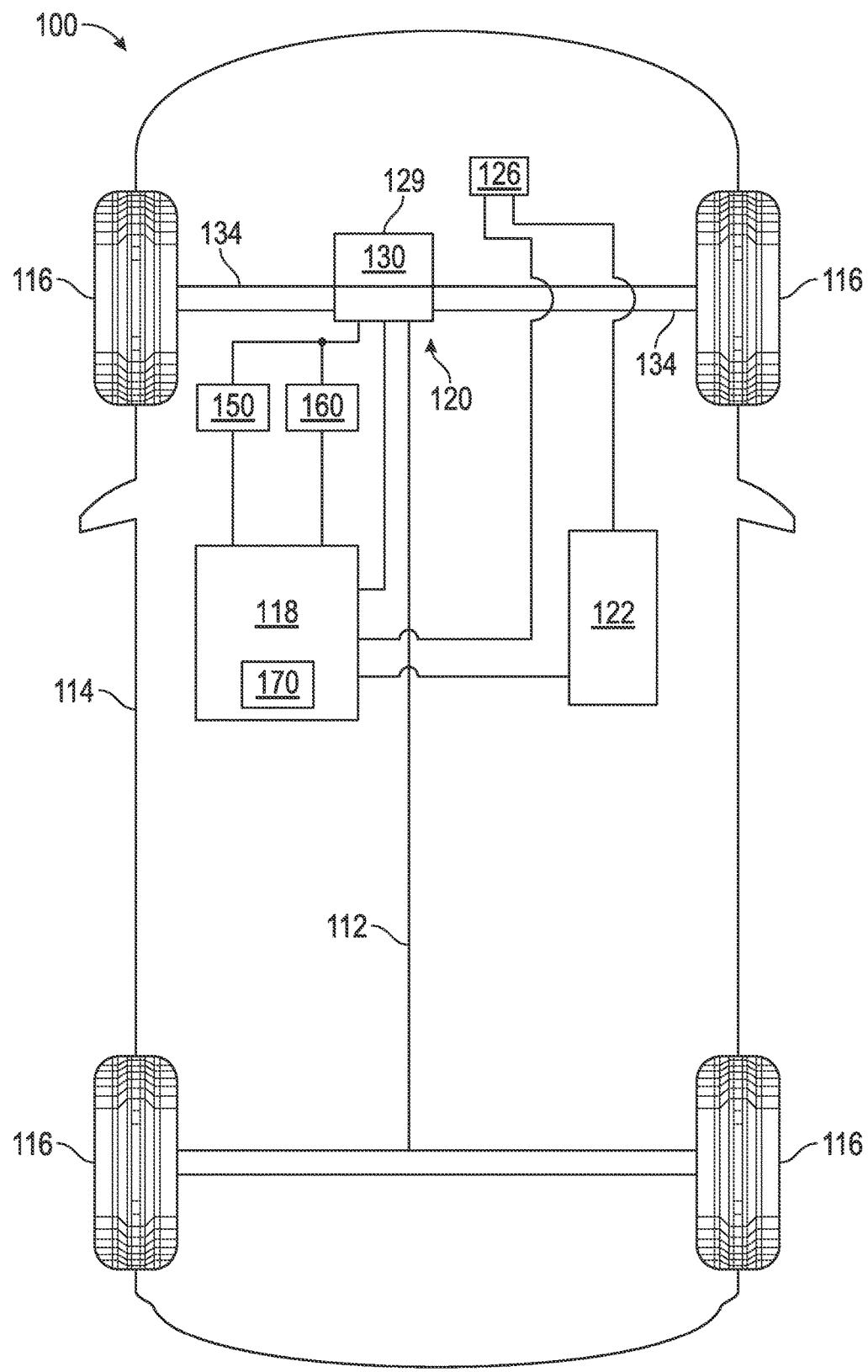
FIG. 1 is a functional block diagram of a vehicle that includes a battery, a rechargeable energy storage system (RESS), an engine with an auto stop feature, and a control system for controlling the auto stop feature of the engine, in accordance with an exemplary embodiment.

FIG. 1 illustrates a vehicle 100, or automobile, according to an exemplary embodiment. The vehicle 100 is also referenced at various points throughout this Application as "the vehicle." As described in greater detail further below, the vehicle 100 includes a rechargeable energy storage system (RESS) 122, an engine 130, and a control system 170 for controlling an auto stop/auto start feature for the engine 130 in accordance with the steps of the process 400 of FIG. 4, described further below.

As depicted in FIG. 1, the vehicle 100 includes a chassis 112, a body 114, four wheels 116, an electronic control system 118, a steering system 150, a braking system 160, and the above-referenced control system 170. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

The engine 130 has an auto stop feature that is controlled by the control system 170 in accordance with the steps of the process 400 described further below in connection with FIG.

4. As part of the auto stop feature (also referred to as an "auto stop/auto start" feature or a "stop/start" feature), the control system 170 turns the engine 130 off in appropriate circumstances (for example, while the driver is engaging the brake pedal and the vehicle is stopped, such as at a red light), provided that the auto stop feature is in an active state. The control system 170 subsequently turns the engine 130 back on again when the driver releases the brake pedal and/or engages the accelerator pedal of the vehicle, in one example. The control system 170 places the auto stop feature in the active state or an inactive state based on determinations discussed further below in connection with the process 400 of FIG. 4.

In one embodiment, the engine 130 comprises a gas or diesel combustion engine. In another embodiment, the vehicle 100 may comprise a battery electric vehicle in which the engine 130 comprises an electric motor, the RESS 122 comprises a high voltage vehicle battery that powers the engine 130, and the vehicle 100 further includes a drive system comprising an actuator assembly 120, the above-referenced RESS 122, and a power inverter assembly (or inverter) 126, wherein the actuator assembly 120 includes at least one electric propulsion system 129 mounted on the chassis 112 that includes the engine 130 and drives the wheels 116. As will be appreciated by one skilled in the art, in certain embodiments the engine (or motor) 130 includes a transmission therein, and, although not illustrated, may also include a stator assembly (including conductive coils), a rotor assembly (including a ferromagnetic core), and a cooling fluid or coolant.

Still referring to FIG. 1, the engine 130 is integrated such that it is mechanically coupled to at least some of the wheels 116 through one or more drive shafts 134. As mentioned above, in one embodiment, the vehicle 100 includes a gas or diesel combustion engine 130. In another embodiment, the vehicle 100 comprises a battery electric vehicle. In certain other embodiments, the vehicle 100 may comprise a hybrid electric vehicle (HEV) that has a combustion engine along with an electric motor. In such other embodiments, the vehicle 100 may comprise a "series HEV" (in which a combustion engine is not directly coupled to the transmission, but coupled to a generator which is used to power the electric motor 130) or a "parallel HEV" (in which a combustion engine is directly coupled to the transmission by, for example, having the rotor of the electric motor 130 rotationally coupled to the drive shaft of the combustion engine).

In one embodiment, the RESS 122 is mounted on the chassis 112. In one embodiment, the RESS 122 comprises a battery having a pack of battery cells. In one embodiment, the RESS 122 comprises a lithium iron phosphate battery, such as a nanophosphate lithium ion battery. In one embodiment, the RESS 122 comprises a twelve volt (12V) battery that powers auxiliary vehicle functions (e.g. radio and other infotainment, air conditioning, lights, and the like) while the engine 130 is turned off, such as during an auto stop event. In another embodiment, the RESS 122 comprises a bank of ultracapacitors, either with or without a battery that may be used with the ultracapacitor bank. In certain other embodiments, the RESS 122 comprises a high voltage battery that, along with an electric propulsion system(s) 129, provide a drive system to propel the vehicle 100 (in one such embodiment, the RESS 122 is also coupled to an inverter 126, as depicted in FIG. 1).

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, inputs via a cruise control resume switch (not depicted), and various other inputs for various vehicle devices and/or systems, such as one or more vehicle radios, other entertainment systems, environmental control systems, lightning units, navigation systems, and the like (also not depicted). In one embodiment, the braking system 160 includes both a regenerative braking capability and a friction braking capability for the vehicle 100.

The control system 170 is mounted on the chassis 112, and is coupled to the engine 130. As noted above, the control system 170 controls the auto stop feature for the engine 130 in accordance with the steps of the process 400 described further below in connection with FIG. 4. In one embodiment, the control system 170 comprises an engine control module (ECM) for generally controlling the engine 130. In addition, in one embodiment depicted in FIG. 1, the control system is part of the electronic control system (ECS) 118 that also controls one or more operations of other vehicle components such as, by way of example, the inverter 126 (if applicable), the RESS 122, the steering system 150, and the braking system 160.

Figure 2:
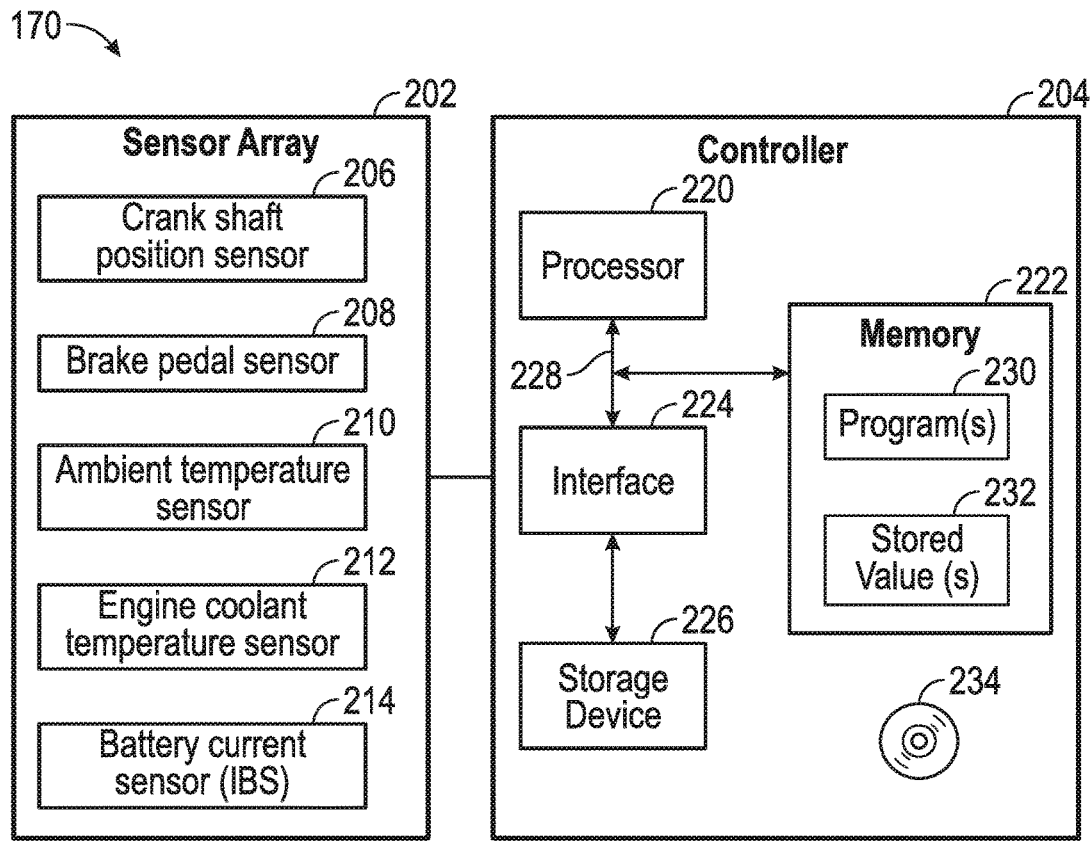
FIG. 2 is a functional block diagram of the control system of FIG. 1, in accordance with an exemplary embodiment.

With reference to FIG. 2, a functional block diagram is provided for the control system 170, in accordance with an exemplary embodiment. As depicted in FIG. 2, the control system 170 includes a sensor array 202 and a controller 204.

The sensor array 202 measures and obtains information for use by the controller 204 for controlling the auto stop feature of the engine. As depicted in FIG. 2, the sensor array 202 includes a crank shaft position sensor 206, a brake pedal sensor 208, an ambient temperature sensor 210, an engine coolant temperature sensor 212, and a battery current sensor 214.

The crank shaft position sensor 206 measures a position of a crank shaft of the engine 130 of FIG. 1, such as during an engine crank event. In one embodiment, the crank shaft position sensor 206 is disposed on the engine 130 of FIG. 1.

The brake pedal sensor 208 measures values pertaining to an engagement of a brake pedal (e.g., brake pedal force and/or brake pedal travel) of the braking system 160 of FIG. 1 by a driver of the vehicle. In one embodiment, the brake pedal sensor 208 is disposed proximate a brake pedal of the braking system 160 of FIG. 1.

The ambient temperature sensor 210 measures an ambient temperature for the vehicle. In one embodiment, the ambient temperature sensor 210 measures an ambient temperature that is external but proximate (or "just outside") the vehicle. Also in one embodiment, the ambient temperature sensor 210 is disposed within or just inside a front hood of the vehicle 100 of FIG. 1.

The engine coolant temperature sensor 212 measures a temperature of the coolant used by the engine 130 of FIG. 1. In one embodiment, the engine coolant temperature sensor 212 is disposed proximate an inlet of the engine 130 of FIG. 1 through which the engine coolant flows.

The battery current sensor 210 measures a current of the RESS 122 of FIG. 1. In one embodiment, the battery current sensor 210 is disposed within the RESS 122 of FIG. 1. In addition, in one embodiment, the battery current sensor 210 comprises an intelligent battery sensor (IBS), or an equivalent sensing methodology, that measures a temperature of the RESS 122 and a voltage of the RESS 122 in addition to the current of the RESS 122.

The controller 204 is coupled to the sensor array 202. The controller 204 controls the auto stop feature for the engine 130 of FIG. 1 based on the information provided by the sensor array 202, in accordance with the steps of the process 400 depicted in FIG. 4 and described below in connection therewith.

As depicted in FIG. 2, the controller 204 comprises a computer system. In certain embodiments, the controller 204 may also include one or more of the sensors of the sensor array 202. In addition, it will be appreciated that the controller 204 may otherwise differ from the embodiment depicted in FIG. 2. For example, the controller 204 may be coupled to or may otherwise utilize one or more remote computer systems and/or other control systems.

In the depicted embodiment, the computer system of the controller 204 includes a processor 220, a memory 222, an interface 224, a storage device 226, and a bus 228. The processor 220 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 230 contained within the memory 222 and, as such, controls the general operation of the controller 204 and the computer system of the controller 204, preferably in executing the steps of the processes described herein, such as the steps of the process 400 (and any sub-processes thereof) in connection with FIG. 4.

The memory 222 can be any type of suitable memory. In various embodiment, this may include the various types of dynamic random access memory (DRAM) such as SDRAM, the various types of static RAM (SRAM), and the various types of non-volatile memory (PROM, EPROM, and flash). In certain examples, the memory 222 is located on and/or co-located on the same computer chip as the processor 220. In the depicted embodiment, the memory 222 stores the above-referenced program 230 along with one or more stored values 232 (preferably, including look-up tables) for use in implementing the measurements from the sensor array 202.

The bus 228 serves to transmit programs, data, status and other information or signals between the various components of the computer system of the controller 204. The interface 224 allows communication to the computer system of the controller 204, for example from a system driver and/or another computer system, and can be implemented using any suitable method and apparatus. It can include one or more network interfaces to communicate with other systems or components. The interface 224 may also include one or more network interfaces to communicate with technicians, and/or one or more storage interfaces to connect to storage apparatuses, such as the storage device 226.

The storage device 226 can be any suitable type of storage apparatus, including direct access storage devices such as hard disk drives, flash systems, floppy disk drives and optical disk drives. In one exemplary embodiment, the storage device 226 comprises a program product from which memory 222 can receive a program 230 that executes one or more embodiments of one or more processes of the present disclosure, such as the steps of the process 400 (and any sub-processes thereof) of FIG. 4, described further below. In another exemplary embodiment, the program product may be directly stored in and/or otherwise accessed by the memory 222 and/or a disk (e.g., disk 234), such as that referenced below.

The bus 228 can be any suitable physical or logical means of connecting computer systems and components. This includes, but is not limited to, direct hard-wired connections, fiber optics, infrared and wireless bus technologies. During operation, the program 230 is stored in the memory 222 and executed by the processor 220.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 220) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
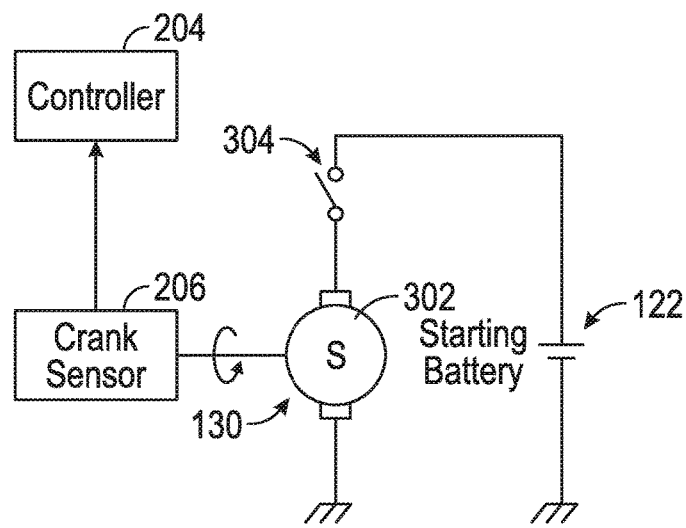
FIG. 3 is a functional block diagram of certain components of the control system of FIGS. 1 and 2, depicted along with the RESS and engine of FIG. 1, in accordance with an exemplary embodiment.

FIG. 3 is a functional block diagram of certain components of the control system 170 of FIGS. 1 and 2, depicted along with the RESS 122 and the engine 130 of FIG. 1, in accordance with an exemplary embodiment. As depicted in FIG. 3, in one embodiment the crank shaft position sensor 206 of FIG. 2 is coupled between the controller 204 (e.g., an engine control module of the vehicle 100) and the engine 130 of FIG. 1. Also as depicted in FIG. 3, in one embodiment the engine 130 has a starter motor 302 that is coupled to the RESS 122 of FIG. 1 via a switch 304 of the starter motor 302 that allows power to flow from the RESS 122 to the starter motor 302 for starting the engine 130. After the controller 204 of FIG. 2 provides an instruction (e.g., via a signal) to start the starter motor 302 via the switch 304, the starter motor 302 engages with the crank shaft of the engine 130 to thereby crank start the engine 130. Also as depicted in one embodiment, the crank shaft position sensor 206 receives inputs as to a position of the crank shaft once the engine 130 begins to rotate. The crank shaft position sensor 206 provides the information regarding the position of the crank shaft at various points in time during the engine crank event to the controller 204, so that the controller 204 can calculate the engine speed (e.g., in revolutions per minute) using the position information in combination with an internal clock/timer of the controller 204. The controller 204 utilizes this information along with other inputs in various embodiments to control the auto stop feature of the engine 130, including placing the auto stop feature on an active or inactive status as appropriate, in accordance with the steps of the process 400 described below in connection with FIG. 4.

Figure 4:
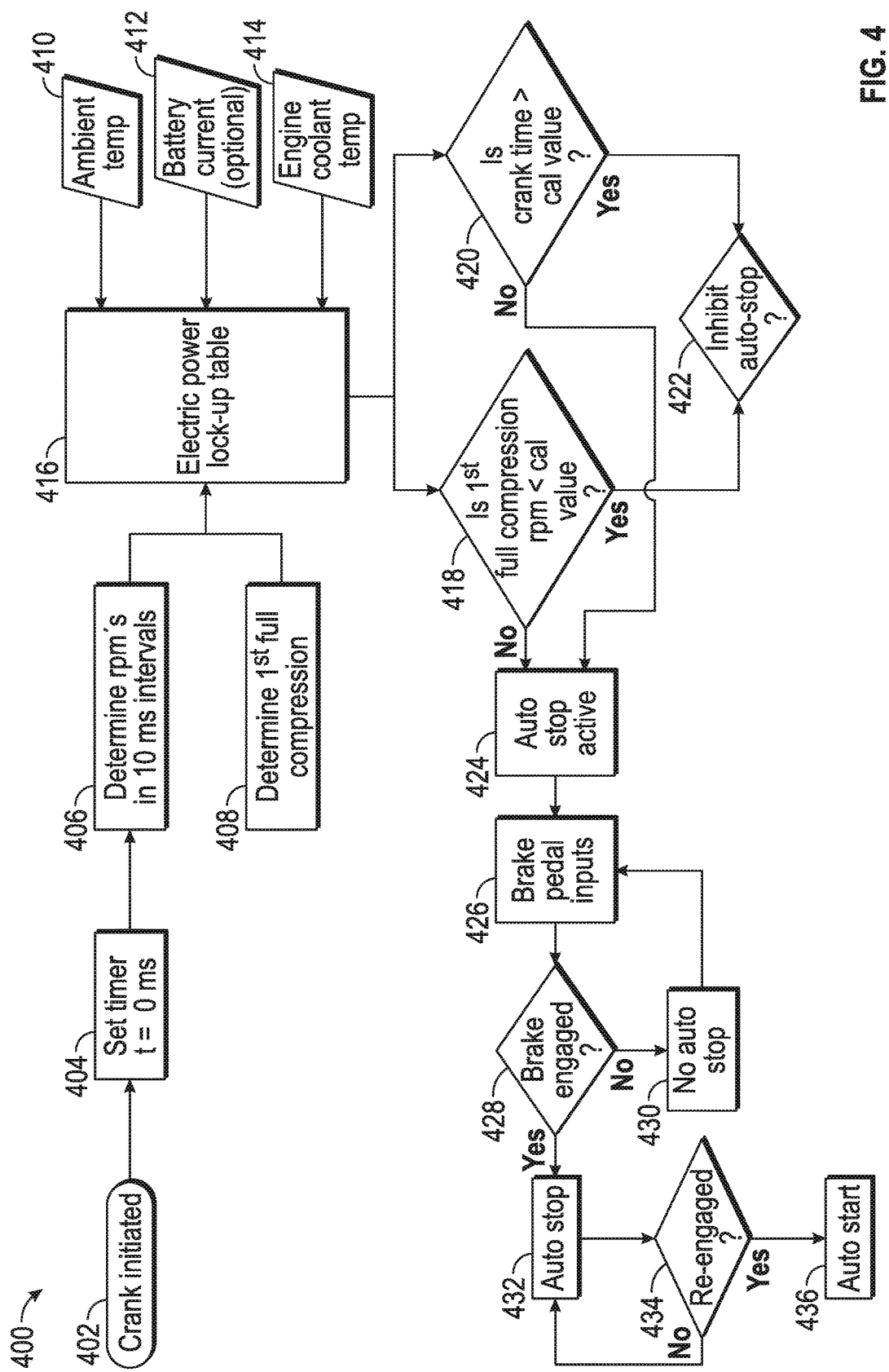
FIG. 4 is a flowchart of a process for controlling an auto stop feature of a vehicle, and that can be used in conjunction with the vehicle of FIG. 1, the RESS and engine of FIGS. 1 and 3, and the control system of FIGS. 1-3, in accordance with an exemplary embodiment.

FIG. 4 is a flowchart of a process 400 for controlling an auto stop feature for a vehicle, in accordance with an exemplary embodiment. The process 400 can be used in connection with the vehicle 100 of FIG. 1, the control system 170 of FIGS. 1-3, and the engine 130 and RESS 122 of FIGS. 1 and 3, in accordance with an exemplary embodiment.

As depicted in FIG. 4, in one embodiment the process 400 begins after commencement of an engine crank (step 402). In one embodiment, the cranking of the engine is determined with by a processor, such as the processor 220 of FIG. 2.

A timer is set (step 404). In one embodiment, the timer is set equal to zero milliseconds (0 ms) by a processor, such as the processor 220 of FIG. 2.

Engine speed values are determined (step 406). In one embodiment, engine speed values are determined in revolutions per minute (RPMs) in regular intervals. In one such embodiment, the engine speed values are determined in intervals of ten milliseconds (10 ms). In one embodiment, the engine speed values are determined by the processor 220 of FIG. 2 based on the processor 200's internal clock and/or timer in combination with crank shaft position values provided by the crank shaft position sensor 206 of FIG. 2, for example similar to the manner described above in connection with FIG. 3. In one embodiment, such engine speed values are calculated by the processor 220 at each time interval (e.g. every ten milliseconds in the above-described example).

Information as to a first full compression of the engine is determined for the current engine crank event (step 408). In one embodiment, the information of step 408 includes an engine speed (in revolutions per minute) at the first full compression as well as the time it has taken from the initiation of the crank of step 402 until the first full compression is reached, based on the engine speed values of step 406 and the timer of step 404. Also in one embodiment, the first full compression of the engine, and the information pertaining thereto, is determined by the processor 220 of FIG. 2 based on the information provided thereto by the crank shaft position sensor 206 of FIG. 2, based at least in part on the initial position of the crank shaft at the time in which the crank event commenced in step 402 and subsequently measured positions of the crank shaft during the crank shaft event. In addition, in one embodiment, the various sensor information is obtained and provided at first full compression and at predetermined times including and beyond the first full compression (e.g., at regular intervals, similar to the regular intervals discussed above) after commencement of engine crank.

In one such embodiment, the first full compression is determined to occur when the position of the crank shaft is at a position known to correspond with the first full compression of the engine. In one embodiment, this position corresponds to eighteen degrees (18°) before top dead center. In one such embodiment, the engine speed of step 406 at this position is considered to be the engine speed at the first full compression. In addition, in this embodiment, the time at which this crank shaft position is reached is considered to be the time at which the first full compression of the engine occurs.

In another embodiment, the first full compression is determined by taking a minimum value of the various engine speeds of step 406. Specifically, in one embodiment, the smallest of the various engine speed values of step 406 during the engine crank event is considered to be the engine speed of the engine at the first full compression. In addition, in this embodiment, the time at which this minimum engine speed occurred is considered to be the time for the first full compression of the engine.

In addition, values of various other parameters are obtained in steps 410-414. In one embodiment, an ambient temperature is obtained at step 410. In one such embodiment, the ambient temperature comprises a temperature just outside the vehicle. In one embodiment, the ambient temperature is measured by the ambient temperature sensor 210 of FIG. 2 and provided therefrom to the processor 220 of FIG. for processing. In addition, in one embodiment, such values are obtained and provided at first full compression and at predetermined times including and beyond the first full compression (e.g., at regular intervals, similar to the regular intervals discussed above) after commencement of engine crank.

Also in one embodiment, an RESS current is obtained at step 412. In one embodiment, the RESS current comprises a current within the RESS 122 of FIG. 1. In certain embodiments, an RESS voltage and/or RESS temperature may be used instead of or in addition to the RESS current. In one embodiment, the RESS measurements of step 412 are obtained by the battery current sensor 214 (or IBS sensor) of FIG. 2. In addition, in one embodiment, such values are obtained and provided at first full compression and at predetermined times including and beyond the first full compression (e.g., at regular intervals, similar to the regular intervals discussed above) after commencement of engine crank.

In addition, in one embodiment, an engine coolant temperature is obtained at step 414. In one embodiment, the engine coolant temperature comprises a temperature of engine coolant for the engine 130 of FIG. 1. In one embodiment, the engine coolant temperature is measured by the engine coolant temperature sensor 212 of FIG. 2. In addition, in one embodiment, such values are obtained and provided at first full compression and at predetermined times including and beyond the first full compression (e.g., at regular intervals, similar to the regular intervals discussed above) after commencement of engine crank.

Threshold values for the first full compression of the engine are obtained (step 416). In one embodiment, the threshold values pertain to expected values for the engine speed at the first full compression and the time to reach the first full compression of step 408 based on the various inputs of steps 410, 412, and/or 414. By way of example, a relatively larger engine speed and a relatively smaller amount of time to reach the first full compression would be expected with a relatively larger ambient temperature. By way of further example, a relatively larger engine speed and a relatively smaller amount of time to reach the first full compression would be expected with a relatively larger battery current (and/or battery voltage and/or battery temperature). By way of additional example, a relatively larger engine speed and a relatively smaller amount of time to reach the first full compression would be expected with a relatively larger engine coolant temperature (which is expected to correspond to an increased oil viscosity).

In certain embodiments, some of the inputs of steps 410, 412, and/or 414 may be utilized while other of the inputs of steps 410, 412, and/or 414 may not be utilized in determining the threshold values. For example, in one embodiment only ambient temperature is used, in other embodiment only engine coolant temperature is used, in yet another embodiment only ambient temperature and engine coolant temperature may be used, and so on.

Also in one embodiment, the threshold values of step 416 comprise values of (1) the engine speed at the first full compression and (2) the time it takes to reach the first full compression after the initiation of the crank event that would correspond to an RESS and/or associated system that may not be ready to effectively perform an auto stop event for the engine (and associated functions during the auto stop event).

For example, in one embodiment, a first one of the threshold values comprises a speed threshold such that, if the engine speed at the first full compression is less than the speed threshold, the RESS and/or associated system may not be able to effectively perform its functions during an auto stop event. By way of additional explanation, an engine speed value at the first full compression that is less than the speed threshold may indicate, for example, that the RESS does not have sufficient charge to re-start the engine after the auto stop, and/or that the RESS does not have sufficient charge to power its auxiliary functions (e.g. radio and/or other infotainment control, air conditioning, lights, and so on) during the auto stop event.

By way of further example, also in one embodiment, a second one of the threshold values comprises a time threshold such that, if the time until the first full compression is obtained is greater than the time threshold, the RESS and/or associated system may not be able to effectively perform its functions during an auto stop event. By way of additional explanation (and similar to the discussion above), a time to first compression value (in milliseconds) that is greater than the time threshold may indicate, for example, that the RESS does not have sufficient charge to re-start the engine after the auto stop, and/or that the RESS does not have sufficient charge to power its auxiliary functions (e.g. radio and/or other infotainment control, air conditioning, lights, and so on) during the auto stop event.

In one embodiment, the threshold values are retrieved by the processor 220 in step 416 from the memory 222 of FIG. 2, specifically using the stored values 232 therein, and/or are determined by the processor 220 using information pertaining thereto from the memory 222. In one such embodiment, the thresholds are retrieved and/or determined by the processor 220 using one or more look-up tables stored in the memory 222 that relate the various inputs of steps 410, 412, and/or 414 to expected engine speed values at the first full compression and expected time values to reach the first full compression based on these inputs. In another such embodiment, the thresholds are retrieved and/or determined by the processor 220 using one or more equations stored in the memory 222 that relate the various inputs of steps 410, 412, and/or 414 to expected engine speed values at the first full compression and expected time values to reach the first full compression based on these inputs.

Determinations are made at steps 418 and 420 as to whether the engine speed at the first full compression and the time of the first full compression are less than and greater than their respective thresholds (i.e., as to whether the engine speed at the first full compression is less than its respective threshold and the time of the first full compression is greater than its respective threshold). As described below, if (i) either the engine speed at the first full compression is less than its respective threshold or (ii) the time of the first full compression is greater than its respective threshold (or both), the auto stop feature is placed in an inactive state in step 422. Conversely, if both (i) the engine speed at the first full compression is greater than or equal to its respective threshold and (ii) the time of the first full compression is less than or equal to its respective threshold, then the auto stop feature remains in an active state in step 424.

As mentioned above, during step 418 a determination is made as to whether the engine speed at the first full compression is less than a predetermined threshold (step 418). In one embodiment, this determination is made by the processor 220 of FIG. 2 as to whether the speed of the engine at the first full compression (as determined in step 408) is less than the speed threshold of step 416 (as determined based on various inputs of steps 410, 412, and/or 414). If it is determined that the engine speed is less than the speed threshold, then the process proceeds to step 422, described further below, in which the auto stop feature is inhibited (or is placed in an inactive state). Conversely, if it is determined that the engine speed is greater than or equal to the speed threshold, and if it is also determined that the first full compression time is less than or equal to its respective threshold (as determined in step 420, discussed below), then the process proceeds instead to step 424, described further below, in which the auto stop feature remains active.

A determination is also made as to whether the time until the first full compression is reached is less than a predetermined threshold (step 420). In one embodiment, this determination is made by the processor 220 of FIG. 2 as to whether the time after the initiation of the crank event in 402 until the first full compression of the engine is obtained (as determined in step 408) is less than the time threshold of step 416 (as determined based on various inputs of steps 410, 412, and/or 414). If it is determined that the time to the first full compression is greater than the time threshold, then the process proceeds to step 422, described further below, in which the auto stop feature is inhibited (or is placed in an inactive state). Conversely, if it is determined that the time to the first full compression is less than or equal to the time threshold, and if the engine speed at the first full compression time is also greater than or equal to its respective threshold (as determined in step 418, discussed above), then the process proceeds instead to step 424, described further below, in which the auto stop feature remains active.

As referenced above, during step 422 the auto stop feature is inhibited if either the engine speed at the first full compression is less than the predetermined speed threshold as determined in step 418, the first full compression time is greater than the predetermined time value as determined in step 420, or both. In one embodiment, during step 422 the auto stop feature for the engine is placed in an inactive state. Specifically, in one embodiment, when the auto stop feature is inhibited (or placed in the inactive state), the auto stop feature is effectively turned off, so that no auto stop events will occur (regardless of whether conditions might otherwise be conducive for at auto stop event, such as when the vehicle is stopped at a stop light, and so on). In one embodiment, the auto stop feature is placed in the inactive state via instructions provided by the processor 220 of FIG. 2.

As noted above and shown in FIG. 2, in one embodiment the auto stop feature is placed in the inactive state if either (i) the engine speed at the first full compression is less than its respective threshold or (ii) the time of the first full compression is greater than its respective threshold (or both), as determined in steps 418 and 420. In one embodiment, the auto stop feature then remains in the inactive state for the duration of the current vehicle drive or ignition cycle. In another embodiment, the auto stop feature remains in the inactive state so long as either (i) the engine speed at the first full compression remains less than its respective threshold or (ii) the time of the first full compression remains greater than its respective threshold (or both). In one embodiment, the process 400 terminates after step 422 is performed.

Also as referenced above, during step 424 the auto stop feature remains active, provided that both (i) the engine speed at the first full compression is greater than or equal to its respective threshold and (ii) the time of the first full compression is less than or equal to its respective threshold, as determined in steps 418 and 420. In one embodiment, during step 424 the auto stop feature for the engine is placed in (or remains in) an active state. Specifically, in one embodiment, when the auto stop feature remains active, auto stop events will occur under appropriate conditions, for example to save energy when the vehicle is stopped at a stop light. In one embodiment, the auto stop remains active via instructions provided by the processor 220 of FIG. 2 (or in the absence of any instructions to the contrary by the processor 220). In another embodiment, the auto stop feature remains in the active state so long as both (i) the engine speed at the first full compression is greater than or equal to its respective threshold and (ii) the time of the first full compression is less than or equal to its respective threshold. The process proceeds to step 426, described below.

During step 426, vehicle inputs are received. Specifically, in one embodiment, values pertaining to a driver's engagement of the brake pedal of the braking system 160 of FIG. 1 are measured by the brake pedal sensor 208 of FIG. 2 (e.g., by measuring values of brake pedal force and/or brake pedal travel). In addition, in certain embodiments, inputs as to a speed of the vehicle are also measured and/or received, for example from one or more non-depicted accelerometers, wheel speed sensors, global positioning system (GPS) devices, or the like.

A determination is made as to whether an auto stop event is warranted (step 428). In one embodiment, the determination of step 428 is made by the processor 220 of FIG. 2 based on a driver's engagement of the brake pedal and/or a speed of the vehicle, using the inputs of step 426. In one such embodiment, the determination of step 428 comprises a determination as to whether the driver is engaging the brake pedal in a sufficient manner to warrant an auto stop event (e.g., if the brake pedal force and/or brake pedal travel values are greater than respective threshold values and/or for at least a predetermined amount of time) while the vehicle is stopped (e.g. as determined by one or more non-depicted wheel speed sensors, accelerometers, global positioning system (GPS) devices, or the like).

If it is determined in step 428 that an auto stop event is not warranted, then the engine remains on, and there is no initiation of an auto stop event (step 430). The process then returns to step 426, as additional inputs are obtained and additional determinations made until it is determined in a subsequent iteration of step 428 that an auto stop event is warranted.

If it is determined in step 428 that an auto stop event is warranted, then the auto stop is implemented for the engine (step 432). As depicted in FIG. 4, the auto stop is implemented only in situations in which the auto stop feature is active in step 424. During step 432, the engine 130 of FIG. 1 is temporarily, automatically stopped (or turned off) via instructions provided by the processor 220 of FIG. 1.

Also during the auto stop event, determinations are made (preferably continuously) as to whether the engine should be re-started (step 434). The determinations are preferably made by the processor 220 of FIG. 2 using inputs from the brake pedal sensor 208 of FIG. 2. In one embodiment, a determination is made that the engine is to be re-started once the driver dis-engages the brake pedal (e.g., once the measured brake pedal force and/or brake pedal travel values fall below respective threshold values).

Once it is determined in step 434 that the engine should be re-started, the engine is automatically re-started accordingly (step 436). In one embodiment, the engine 130 of FIG. 1 is automatically re-started (or turned back on) via instructions provided by the processor 220 of FIG. 2. In one embodiment, the process returns to step 402, and the engine thereafter remains in the "on" state until a subsequent determination is made in an iteration of step 428 that another auto stop event is warranted (and provided that the auto stop feature is still active in the latest iteration of step 424). Conversely, until it is determined in step 434 that the engine should be re-started, the engine remains turned off during step 432. Also in one embodiment, the process 400 terminates at the completion of the current vehicle drive or ignition cycle.

The process 400 of FIG. 4 thus provides for potentially improved control of an auto stop feature for an engine of a vehicle. The process 400 provides enhanced energy efficiency by initiating auto stops for the engine at appropriate times (e.g. when the vehicle is stopped at a traffic light) when the auto stop feature is active. However, when it is determined that the RESS and/or associated system may not be in proper condition to support the auto stop and re-start of the engine (e.g., if the RESS charge is sufficiently low such that the RESS may not be in a condition to properly control auxiliary functions during an engine auto stop and/or to properly re-start the engine at the conclusion of an auto stop event, as determined based upon the engine speed at the first full compression and the time until the first full compression is attained, and in certain embodiments based on other inputs related thereto, as discussed in greater detail above), the auto stop feature is placed in an inactive state to avoid any inconvenience to the driver and/or passengers of the vehicle.

Accordingly, methods and systems are provided for controlling an auto stop feature for an engine of a vehicle. As discussed above, the auto stop functionality is selectively placed in an inactive state under appropriate circumstances, based on the engine speed at the first full compression and the time until the first full compression is attained (and in certain embodiments based on other inputs relating thereto).

It will be appreciated that the vehicle of FIG. 1, and/or the systems of FIGS. 1-3, including without limitation the RESS 122, the engine 130, and the control system 170, and/or components thereof, may vary in different embodiments. It will also be appreciated that various steps of the process 400 described herein in connection with FIG. 4 may vary in certain embodiments. It will similarly be appreciated that various steps of the process 400 described herein in connection with FIG. 4 may occur simultaneous with one another, and/or in a different order as presented in FIG. 4 and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling an auto stop feature of an engine of a vehicle, the method comprising:

determining, using information provided by a sensor, an engine speed at a first full compression of the engine after commencement of an engine crank; and disabling, using a processor, the auto stop feature if the engine speed is less than a predetermined speed threshold.

2. The method of claim 1, further comprising:

determining an amount of time between the initiation of the engine crank and the first full compression of the engine; and disabling the auto stop feature if the engine speed is less than a predetermined time threshold.

3. The method of claim 1, wherein:

the engine has a crank shaft;

the method further comprises measuring positions of the crank shaft during the engine crank; and the step of determining the engine speed at the first full compression of the engine comprises determining the engine speed when the crank shaft is at a position known to correspond with the first full compression of the engine.

4. The method of claim 1, wherein the step of determining the engine speed at the first full compression of the engine comprises:

determining a plurality of engine speeds at multiple times throughout the engine crank; and determining the engine speed at the first full compression of the engine to comprise a minimum of the plurality of engine speeds.

5. The method of claim 1, further comprising:

measuring an ambient temperature for the vehicle;

wherein the step of disabling the auto stop feature comprises:

disabling the auto stop feature if the engine speed is less than the predetermined speed threshold, wherein the predetermined speed threshold is dependent upon the ambient temperature.

6. The method of claim 1, wherein the engine uses an engine coolant, and the method further comprises:

measuring a coolant temperature of the engine coolant;

wherein the step of disabling the auto stop feature comprises:

disabling the auto stop feature if the engine speed is less than the predetermined speed threshold, wherein the predetermined speed threshold is dependent upon the coolant temperature.

7. The method of claim 1, wherein the vehicle includes a battery, and the method further comprises:

determining a current of the battery; wherein the step of disabling the auto stop feature comprises:

disabling the auto stop feature if the engine speed is less than the predetermined speed threshold, wherein the predetermined speed threshold is dependent upon the current of the battery.

8. A system for controlling an auto stop feature of an engine of a vehicle, the system comprising:

a sensor configured to provide information pertaining to an engine speed at a first full compression of the engine after commencement of an engine crank; and a processor coupled to the sensor and configured to disable the auto stop feature if the engine speed is less than a predetermined speed threshold.

9. The system of claim 8, wherein the processor is further configured to:

determine an amount of time between the initiation of the engine crank and the first full compression of the engine; and disable the auto stop feature if the engine speed is greater than a predetermined time threshold.

10. The system of claim 8, wherein:

the engine has a crank shaft;

the sensor is configured to measure positions of the crank shaft during the engine crank; and the processor is configured to determining the engine speed when the crank shaft is at a position known to correspond with the first full compression of the engine.

11. The system of claim 8, wherein:

the sensor is configured to obtain information pertaining to a plurality of engine speeds at multiple times throughout the engine crank; and processor is configured to determine the engine speed at the first full compression of the engine to comprise a minimum of the plurality of engine speeds.

12. The system of claim 8, further comprising:

a second sensor configured to measure an ambient temperature for the vehicle;

wherein the predetermined speed threshold is dependent upon the ambient temperature.

13. The system of claim 8, wherein:

the engine uses an engine coolant;

the system further comprises a second sensor configured to measure a coolant temperature for the engine coolant; and the predetermined speed threshold is dependent upon the coolant temperature.

14. The system of claim 8, wherein:

the vehicle includes a battery;

the system further comprises a second sensor configured to measure a current of the battery; and the predetermined speed threshold is dependent upon the current of the battery.

15. A vehicle comprising:

a drive system comprising an engine having an auto stop feature; and a control system comprising:

a sensor configured to provide information pertaining to an engine speed at a first full compression of the engine after commencement of an engine crank; and a processor coupled to the sensor and configured to disable the auto stop feature if the engine speed is less than a predetermined speed threshold.

16. The vehicle of claim 15, wherein the processor is further configured to:

determine an amount of time between the initiation of the engine crank and the first full compression of the engine; and disable the auto stop feature if the time to first compression is greater than a predetermined time threshold.

17. The vehicle of claim 15, wherein:

the engine has a crank shaft;

the sensor is configured to measure positions of the crank shaft during the engine crank; and the processor is configured to determining the engine speed when the crank shaft is at a position known to correspond with the first full compression of the engine.

18. The vehicle of claim 15, wherein:

the sensor is configured to obtain information pertaining to a plurality of engine speeds at multiple times throughout the engine crank; and processor is configured to determine the engine speed at the first full compression of the engine to comprise a minimum of the plurality of engine speeds.

19. The vehicle of claim 15, wherein:

the control system further comprises a second sensor configured to measure an ambient temperature for the vehicle; and the predetermined speed threshold is dependent upon the ambient temperature.

20. The vehicle of claim 15, wherein:

the engine uses an engine coolant;

the control system further comprises a second sensor configured to measure a coolant temperature for the engine coolant; and the predetermined speed threshold is dependent upon the coolant temperature.

\* \* \* \* \*